United States Patent
Hähniche et al.

(10) Patent No.: US 8,886,786 B2
(45) Date of Patent: Nov. 11, 2014

(54) METHOD FOR PLANT MONITORING WITH A FIELD BUS OF PROCESS AUTOMATION TECHNOLOGY

(75) Inventors: Jörg Hähniche, Bad Krozingen (DE); Matthias Römer, Grünberg (DE)

(73) Assignee: Endress + Hauser Process Solutions AG, Reinach (CH)

( * ) Notice: Subject to any disclaimer, the term of this patent is extended or adjusted under 35 U.S.C. 154(b) by 1350 days.

(21) Appl. No.: 12/086,914

(22) PCT Filed: Dec. 19, 2006

(86) PCT No.: PCT/EP2006/069885
§ 371 (c)(1),
(2), (4) Date: May 24, 2010

(87) PCT Pub. No.: WO2007/074105
PCT Pub. Date: Jul. 5, 2007

(65) Prior Publication Data
US 2010/0262264 A1    Oct. 14, 2010

(30) Foreign Application Priority Data

Dec. 29, 2005 (DE) .................. 10 2005 063 053

(51) Int. Cl.
| | |
|---|---|
| G06F 15/16 | (2006.01) |
| G06F 15/173 | (2006.01) |
| G05B 9/02 | (2006.01) |
| G05B 19/418 | (2006.01) |

(52) U.S. Cl.
CPC .. *G05B 19/4184* (2013.01); *G05B 2219/31211* (2013.01); *G05B 2219/33209* (2013.01); *G05B 2219/31121* (2013.01)
USPC .............................. 709/224; 709/208; 700/79

(58) Field of Classification Search
USPC ................ 709/208, 223, 224; 700/79, 80, 81
See application file for complete search history.

(56) References Cited

U.S. PATENT DOCUMENTS

| | | | |
|---|---|---|---|
| 5,550,957 A * | 8/1996 | Davidson et al. ............ | 358/1.15 |
| 5,796,721 A | 8/1998 | Gretta, Jr. | |
| 6,285,966 B1 | 9/2001 | Brown et al. | |
| 6,850,994 B2 * | 2/2005 | Gabryjelski .................... | 710/19 |
| 2002/0002406 A1 * | 1/2002 | Bermann et al. ................. | 700/2 |
| 2002/0055790 A1 | 5/2002 | Havekost | |
| 2004/0139264 A1 * | 7/2004 | Gros et al. .................... | 710/305 |

(Continued)

FOREIGN PATENT DOCUMENTS

| | | |
|---|---|---|
| DE | 198 60 358 | 7/2000 |
| DE | 199 04 892 A1 | 8/2000 |
| DE | 199 04 893 | 8/2000 |
| DE | 199 09 091 | 9/2000 |
| DE | 299 23 430 | 6/2001 |

(Continued)

*Primary Examiner* — Brian J Gillis
(74) *Attorney, Agent, or Firm* — Bacon & Thomas, PLLC

(57) ABSTRACT

A method for plant monitoring with a fieldbus of process automation technology, wherein a plurality of field devices communicate with a process control unit and a plant monitoring unit The method steps are carried out as follows: the regular, process-control, data traffic on the fieldbus is monitored by the plant monitoring unit; an examination of the telegrams of the regular data traffic for information indicating a diagnostic event at one of the field devices is performed; and in case a telegram is detected having an indication of a diagnostic event, the plant monitoring unit requests further diagnostic information from the pertinent field device.

13 Claims, 2 Drawing Sheets

(56) References Cited

U.S. PATENT DOCUMENTS

2005/0012608 A1* 1/2005 Havekost et al. ............ 340/517
2006/0058847 A1* 3/2006 Lenz et al. ..................... 607/5
2006/0161705 A1* 7/2006 Schultze et al. ............ 710/106

FOREIGN PATENT DOCUMENTS

| DE | 10 2004 017 529 A1 | 11/2005 |
| EP | 1 381 139 | 1/2004 |
| WO | WO 2004/010645 A1 | 1/2004 |

* cited by examiner

METHOD FOR PLANT MONITORING WITH A FIELD BUS OF PROCESS AUTOMATION TECHNOLOGY

TECHNICAL FIELD

The invention relates to a method for plant, or installation, monitoring with a field bus of process automation technology, as such method is defined in the preamble of claim 1.

BACKGROUND DISCUSSION

In automation technology, field devices are often used, to serve for measuring and/or influencing process variables. Examples of such field devices are fill-level measuring devices, mass-flow measuring devices, pressure and temperature measuring devices, etc., which, as sensors, register the corresponding process variables, fill-level, flow (e.g. flow rate), pressure and temperature.

Field devices serving as actuators, to influence process variables, include, e.g., valves for controlling flow of a liquid in a section of pipeline or pumps for controlling fill level in a container.

A large number of such field devices are manufactured and sold by the firm, Endress+Hauser.

As a rule, field devices in modern manufacturing plants are connected via communication systems (HART, Profibus, Foundation Fieldbus, etc.) with superordinated units (e.g. control systems or control units). These superordinated units serve, among other things, for process control, process visualizing, process monitoring, as well as for tasks such as commissioning and other servicing of field devices.

Also falling under the heading "field devices" are, in general, such units (e.g. remote I/Os, gateways, linking devices) as are directly connected to a fieldbus and serve for communication with the superordinated units.

Fieldbus systems can be integrated into company networks. In this way, process and field device data can be accessed from different areas of an enterprise.

For worldwide communication, company networks can be connected also with public networks, e.g. the Internet.

The servicing of field devices requires corresponding operating programs. These operating programs can run independently in the superordinated units (e.g. FieldCare, Endress+Hauser; Pactware; AMS, Emerson; Simatic PDM, Siemens) or they can be integrated into control system applications (e.g. Simatic PCS7, Siemens; ABB Symphony; Delta V, Emerson). Besides control system applications, also operating programs, in part, already exhibit functionalities as regards plant monitoring (asset management).

A user places, in principle, two completely different requirements on fieldbus systems. One of these is process control, and the other is plant monitoring, or plant visualizing.

In the case of the fieldbus system PROFIBUS®, process control occurs via a cyclic data transfer. In such case, field devices exchange measured values at regular intervals with a process control unit (Controller), which generates corresponding control commands, e.g. for the pertinent actuators. As is known, in the case of PROFIBUS, communication between process control unit and field device is done using the Master-Slave-principle, wherein the process control unit functions as master and the field devices as slaves. Control of bus access is managed by the master, which sends control commands to the individual field devices via polling telegrams. The field device is permitted to transmit measured values to the master in a response telegram only after it has first received a polling telegram. The sequence of polling telegram and response telegram is executed by the master in time sequence with each of the slaves associated with it. The time until, in this way, each of the slaves associated with the master has been processed is referred to as the cycle time. Following the end of a cycle, the master then begins a new cycle. Process control systems are microprocessor-based, automation devices, whose control functionality is specified by automation software produced by automation personnel in the course of an engineering procedure and executed in the automation device in real time.

Programs or parts of programs having functionalities as regards plant monitoring are referred to in the following as asset-management-systems. These serve for processing device information for monitoring and optimizing device- and plant-states. The communication of data for asset-management purposes is done, as a rule, in the acyclic data traffic, for which a certain time interval is available between two succeeding cycles. The updating of data for purposes of asset-management happens, compared with the cyclic data traffic, in which an updating occurs after each cycle time, markedly slower.

Visualizing systems present the current parameters of the process on a user interface. Frequently, for the visualizing, besides the numerical values of a process variable and its units, also changed graphical symbols, such as dials, bars or trend charts, are used. Visualizing systems draw the data, most often, from process control systems. The visualizing system is, in the context of a user interface, also capable of influencing certain variables in the control system, which, in turn can itself have an influence on the course of the control program or the process.

Since process control tasks have precedence, the time interval available for the acyclic data traffic is markedly shorter than the time interval for the cyclic traffic.

As regards diagnostic data, one distinguishes between event-dependent, diagnostic data and diagnostic data read out only upon request e.g. of an asset-management-system. In the case of the fieldbus system, PROFIBUS, event-dependent, diagnostic data are bound to the communication partner cyclically communicating with the slave devices assigned to it (PROFIBUS Master Class 1).

This assures that a process control unit having cyclic data exchange with the slave devices reacts in near time to the diagnostic results. An asset-management-system connected with a control system application can be prompted by such application to fetch acyclic, diagnostic data. Therewith, the advantages of the event-dependent diagnosis (short reaction time) can be coupled with the desire for detailed information (additional, diagnostic data, which are communicated acyclically). While the diagnostic data communicated in place of the process data are of Boolean nature (to each bit corresponds a piece of diagnostic data, which can be identified by the device), the acyclically transmitted, diagnostically relevant data can include e.g. the degree of wear of a probe or the degree of fouling of the measuring device.

Proprietary solutions are known for the combination of process control and asset-management-system (for example, SIMATIC PCS7, of the firm, Siemens).

An asset-management-system independent of the process control can only request diagnostic data in the acyclic data traffic. Since, in this case, the asset-management-system is not informed of diagnostic events by a process control, it is necessary that diagnostic data be regularly requested, in order that diagnostic events can even be noticed by the asset-management-system.

Especially in the case of plants having a significant number of installed field devices and a multiplicity of diagnostically relevant parameters to be monitored, it is a fact that the updating of these parameters in the asset-management-system takes a very long time, so that long reaction times result. These long reaction times are very disadvantageous, especially in the case of critical diagnostic events. The long reaction times can even compromise the ability of the asset management systems to function.

The terminology "diagnostic event" is meant to include not only diagnostic reports from field devices but also issuance of alarms.

SUMMARY OF THE INVENTION

An object of the invention is to provide a method for plant monitoring with a fieldbus of process automation technology not having the above discussed advantages, while possessing a highest possible measure of independence from the process control and, in spite of this, reacting to diagnostic events as quickly as possible.

This object is achieved by a method comprising the steps of: monitoring by a plant monitoring unit regular, process-control, data traffic carried on a fieldbus to which a plurality of field devices are connected; examining telegrams of the regular data traffic for information indicating a diagnostic event at one of the field device; and, in case of a telegram with an indication of a diagnostic event being detected, requesting by the plant monitoring unit further diagnostic information from such field device.

BRIEF DESCRIPTION OF THE DRAWINGS

The invention will now be explained in greater detail on the basis of an example of an embodiment presented in the drawing, the figures of which show as follows.

DETAILED DISCUSSION

Figure 1:
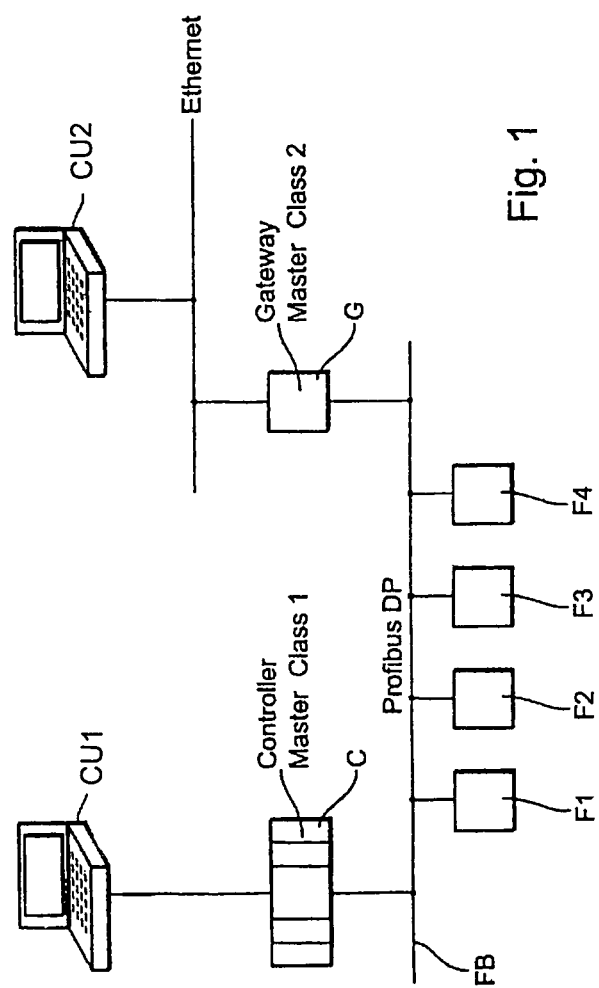
FIG. 1 is a network of process automation technology.

FIG. 1 shows a network of process automation technology. Attached to a fieldbus FB are a plurality of field devices F1, F2, F3 and F4. Additionally connected to the fieldbus FB are a controller C (for example, FieldController of the firm, Endress+Hauser) and a gateway G (for example, FieldGate of the firm, Endress+Hauser). Controller C is connected with a computer unit CU1 serving as a visualizing system. Gateway G is connected with a computer unit CU2, which serves for observing field devices.

Field devices F1 to F4 are configured as slaves. Controller C is configured as Master Class 1 and Gateway G as Master Class 2. Serving as process control unit is controller C, which cyclically sends output data to the individual field devices and receives output data from the individual field devices.

Serving as plant monitoring unit is the Gateway G, which communicates acyclically with the field devices.

Figure 2:
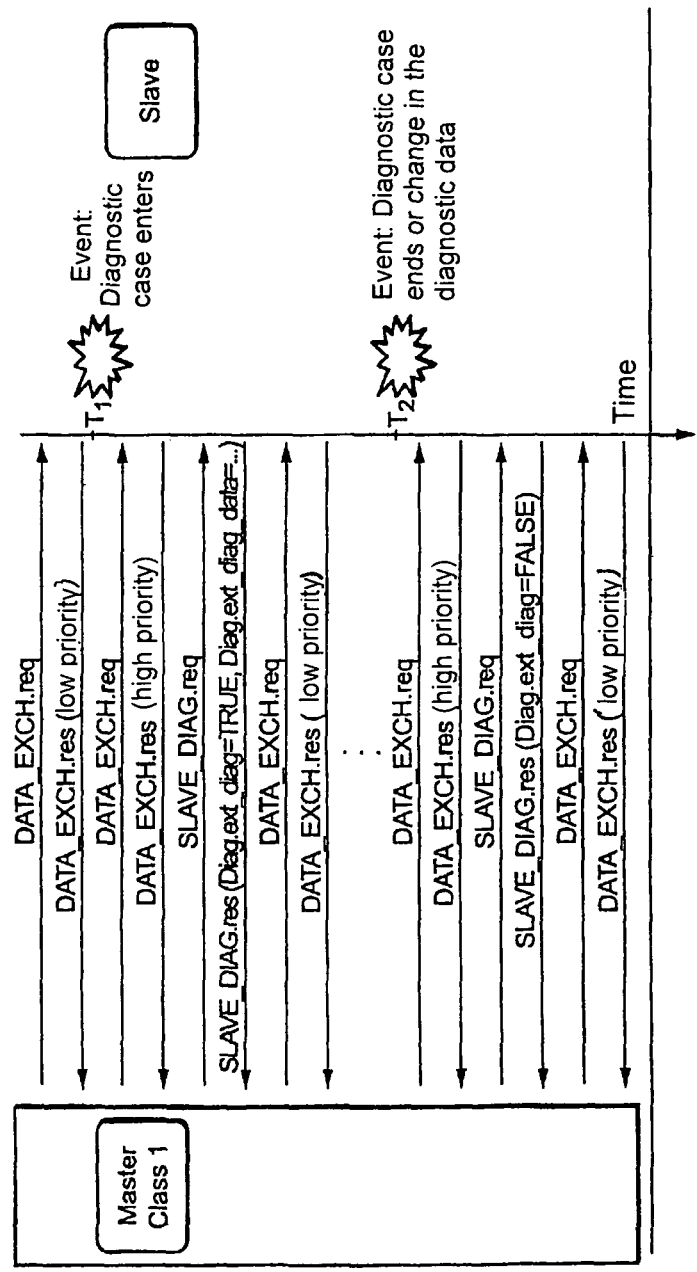
FIG. 2 is a timing diagram of a Master-Slave communication.

FIG. 2 shows, schematically, a timing diagram for communication between controller C (Master) and field device F1 (Slave).

The Master sends, normally in cyclic data traffic, a polling telegram (request) to the Slave, and the Slave answers with a response telegram (response) with low priority (Data_Exch).

The priority is shown in the Profibus telegram in the frame control byte.

In the case of a diagnostic event in the slave, the priority of the response telegram is changed from "low" to "high". As soon as a response with high priority is sent from the field device, in the next data traffic from the master, a Slave_Diag request is issued, instead of a Data_Exchange request, so that the Master is now requesting diagnostic data from the slave, instead of process data.

At the point in time T1, such a diagnostic event "(Diagnostic case)" occurs. To the request of the Master, the slave responds with a response with priority "high".

Due to this information indicating a diagnostic event in the field device, the Master sends a request (Slave_Diag) and the Slave answers with a response (Slave_Diag). This response contains special diagnostic data of the slave.

Thereafter, the cyclic data traffic is resumed. At the point in time T2, the diagnostic event "diagnostic case ended" or "change of diagnostic data" enters. In order that the current diagnostic data can be transmitted to the Master, the slave sends anew a response with high priority, which, in turn, prompts the Master to send a request (Slave_Diag), whereupon the slave responds with a response (Slave_Diag).

Only an asset management system integrated in the master can access these diagnostic data present in the master, or bring about that the master activates acyclic data access, in order to obtain additional diagnostic data from the field device. These accesses are then executed via read requests.

An asset management system independent of the control system, as integrated, in the present case, in the gateway G, can, however, only obtain diagnostic data, when it obtains, as Master Class 2, on the basis of the occurrence of a diagnostic event, the right to transmit, in order so to obtain diagnostic-relevant data via acyclic communication.

The method of the invention will now be explained in greater detail. Gateway G monitors, or taps (in the sense of wiretapping), as plant monitoring unit, the regular data traffic on the fieldbus FB. This regular (cyclic) data traffic serves essentially for process control.

In the Gateway G, an examination of this data traffic for information indicating the entering of a diagnostic event at one of the field devices occurs. A diagnostic event can be e.g. a malfunction of the field device per se or, however, also the measuring of a surrounding temperature which is too high (Alarm). Thus, the individual telegrams of the regular data traffic are analyzed as to whether a response telegram of a slave is being transmitted with high priority.

In case a telegram of a slave is detected having an indication of a diagnostic event, gateway G requests further diagnostic information from the pertinent field device.

An essential advantage offered by the method of the invention is that the asset-management-system provided in the gateway G does not have to regularly query each individual field device for diagnostic information in acyclic traffic, but, instead, only when a concrete indication of a disturbance is present.

In this way, also an asset-management-system independent of a process control can detect diagnostic cases quickly and reliably and introduce appropriate measures. An opportunity is provided therein to represent the diagnostic event for the user or to enter it into a database with a corresponding date stamp. Also E-Mails or SMS text messages containing information corresponding to the diagnostic event can be sent from the asset-management-system to responsible persons.

The invention can be applied both in the case of the Profibus fieldbus system and also in that of Foundation Fieldbus. To adapt FIG. 1 to the Foundation Fieldbus system, remove the designations Master Class 1 and Master Class 2 and replace the label Profibus DP with Foundation Fieldbus.

The invention relates not only to the detection of diagnostic events, but, instead, extends to the observation of the current process data of a certain one or all connected slaves as such data is transmitted cyclically to the pertinent master, without the bus traffic being compromised. The process data of a slave are now made available to a visualizing system, or to an asset management system, or to a communication participant of another communication system, without the plant monitoring unit G itself actively participating in the bus communication therefor. The plant monitoring unit is, in this case, it is true, connected to the fieldbus FB, but it is not configured as a bus participant. It only monitors the bus traffic and lets the telegrams proceed.

The telegrams are examined in the plant monitoring unit as to whether a telegram is one of the cyclic data exchange. In case such is true, the content of the telegram is stored together with the following information: destination address of the telegram and source address of the telegram.

If the destination address is the master address, then the data is labeled as "input data from the slave with source address". If, in contrast, the source address is the master address, then the data is labeled as "output data to the slave with the destination address".

The storage can be done in a permanent memory that stores all telegrams. Alternatively, the storage can be done in a circular, or ring, buffer, which stores a certain amount of data, or in a memory which overwrites a previous telegram with a new telegram having the identical source/destination address.

The detected process data, together with the information concerning destination/source address, are made available to a visualizing system. The visualizing system can be part of the plant monitoring unit or part of the computer unit R2. The data can be transmitted to the visualizing system via a proprietary communication protocol or an open communication protocol.

The detected process data can also be made available to an asset management system, together with the information concerning destination/source address.

Alternatively, the detected process data, together with the information concerning destination/source address, can be made available to a control system. The detected process data can then be utilized in the automation software, in order to initiate reactions of the control system for influencing the process.

The detected process data can also be made available via an interface, e.g. a PROFINET I/O-interface in the sense of a PROFINET I/O-device, provided in the plant monitoring unit G. In this way, the process data detected in the PROFIBUS-DP-system are transmitted into a PROFINET IO-system.

The invention claimed is:

1. A method for plant monitoring a plurality of field devices connected with a fieldbus of process automation technology, with a process control unit and a plant monitoring unit, the method comprising the steps of:
   connecting the process control unit and the plant monitoring unit to the fieldbus;
   generating regular data traffic using the process control unit by cyclically sending output data to the individual field devices and receiving output data from the individual field devices;
   issuing telegrams of the regular data traffic;
   tapping by the plant monitoring unit the regular data traffic generated by the process control unit,
   examining by the plant monitoring unit the issued telegrams of the regular data traffic for information indicating a diagnostic event at one of the field devices; and
   requesting, when a telegram issued by a field device and detected by the plant monitoring unit, which telegram indicates a diagnostic event, by the plant monitoring unit via acyclic traffic further diagnostic information from such field device, wherein:
   acyclic data traffic occurs during a certain time interval which is available between two succeeding cycles of regular data traffic.

2. The method as claimed in claim 1, wherein:
a gateway that is connected to the field bus fieldbus serves as plant monitoring unit which communicates acyclically with the field devices.

3. The method as claimed in claim 2, wherein:
an asset management system independent of the process control system unit is integrated in the gateway.

4. The method as claimed in claim 2, wherein:
the examining for indication indicating the entering of a diagnostic event at one of the field devices occurs in the gateway.

5. The method as claimed in claim 1, wherein:
increased priority of a telegram sent from a field device serves for indicating a diagnostic event.

6. The method as claimed in claim 1, wherein:
a diagnostic request from the process control unit to the field device serves for indicating a diagnostic event.

7. The method as claimed in claim 1, wherein: the plant monitoring unit itself is not actively participating in the bus communication therefore.

8. The method as claimed in claim 1, wherein: the plant monitoring unit is not configured as a bus participant.

9. The method as claimed in claim 1, wherein: a gateway that is connected to the field bus serves as plant monitoring unit.

10. A method for plant monitoring with a fieldbus of process automation technology, wherein a plurality of field devices communicate via the fieldbus with a process control unit, wherein a plant monitoring unit is connected with the fieldbus, the method comprising the steps of:
   tapping by the plant monitoring unit regular data traffic, related to process-control, on the fieldbus, whereas the process control unit cyclically sends output data to the individual field devices and receives output data from the individual field devices, wherein the regular data traffic consists of cyclic data traffic,
   examining by the plant monitoring unit telegrams as to whether the tapped data are cyclic telegrams;
   in the case of cyclic telegrams, storing the content of the telegram together with the telegram destination address and the telegram source address; and
   forwarding the content of the telegram together with the information concerning destination/source address to a visualizing system, or an asset management system, or a communication participant of another communication system;
   examining by the plant monitoring unit the issued telegrams of the regular data traffic for information indicating a diagnostic event at one of the field devices; and
   requesting, when a telegram issued by a field device and detected by the plant monitoring unit, which telegram indicates a diagnostic event, by the plant monitoring unit via acyclic traffic further diagnostic information from such field device;
   wherein acyclic data traffic occurs during a certain time interval which is available between two succeeding cycles of regular data traffic.

11. The method as claimed in claim 10, wherein:
the plant monitoring unit itself is not actively participating in the fieldbus communication therefore.

12. The method as claimed in claim 10, wherein:
the plant monitoring unit is not configured as a bus participant.

13. The method as claimed in claim 10, wherein:
a gateway that is connected to the field bus field bus serves as plant monitoring unit.

\* \* \* \* \*